(12) United States Patent
Hendrickson et al.

(10) Patent No.: US 8,312,309 B2
(45) Date of Patent: Nov. 13, 2012

(54) TECHNIQUE FOR PROMOTING DETERMINISM AMONG MULTIPLE CLOCK DOMAINS

(75) Inventors: Eric L. Hendrickson, Fountain Valley, CA (US); Sanjoy Mondal, Austin, TX (US); Larry Thatcher, Austin, TX (US); William Hodges, Austin, TX (US); Lance Hacking, Austin, TX (US); Sankaran Menon, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 692 days.

(21) Appl. No.: 12/042,985

(22) Filed: Mar. 5, 2008

(65) Prior Publication Data

US 2009/0228736 A1 Sep. 10, 2009

(51) Int. Cl.
*G06F 1/12* (2006.01)
*G06F 11/00* (2006.01)

(52) U.S. Cl. ........................ 713/400; 713/502; 714/34

(58) Field of Classification Search .................. 713/400, 713/500–502, 600, 601; 714/30, 34, 38, 714/47

See application file for complete search history.

(56) References Cited

U.S. PATENT DOCUMENTS

| | | | | |
|---|---|---|---|---|
| 3,999,169 A | * | 12/1976 | Perschy | 713/600 |
| 4,099,255 A | * | 7/1978 | Stanley et al. | 710/262 |
| 5,167,024 A | * | 11/1992 | Smith et al. | 713/322 |
| 5,295,257 A | * | 3/1994 | Berkovich et al. | 713/400 |
| 5,377,347 A | * | 12/1994 | Hiiragizawa et al. | 713/502 |
| 5,586,332 A | * | 12/1996 | Jain et al. | 713/322 |
| 5,787,132 A | * | 7/1998 | Kishigami et al. | 375/354 |
| 6,118,306 A | * | 9/2000 | Orton et al. | 327/44 |
| 6,127,895 A | * | 10/2000 | Tailor | 331/1 A |
| 6,128,745 A | * | 10/2000 | Anderson et al. | 713/323 |
| 6,442,704 B1 | * | 8/2002 | Morimoto et al. | 713/500 |
| 6,724,850 B1 | * | 4/2004 | Hartwell | 375/376 |
| 6,839,654 B2 | * | 1/2005 | Rollig et al. | 702/178 |
| 6,948,098 B2 | * | 9/2005 | Pillay et al. | 714/34 |
| 7,269,768 B2 | * | 9/2007 | Rothman et al. | 714/723 |

OTHER PUBLICATIONS

Foreign counterpart Office Action from China Patent Application No. 200910126922.6 mailed Mar. 24, 2010, 8 pages.
Foreign counterpart Office Action from Korean Patent Application No. 2009-0018398 mailed Feb. 21, 2011, 4 pages.
Foreign counterpart Office Action from Russian Patent Application No. 2009107795/08 mailed Nov. 13, 2010, 10 pages.
Foreign counterpart Office Action from China Patent Application No. 200910126922.6 mailed Dec. 14, 2011, 12 pages.
Foreign counterpart Office Action from Korean Patent Application No. 2009-0018398 mailed Oct. 20, 2011, 3 pages.
Foreign counterpart Office Action from Japanese Patent Application No. 2009-045539 mailed Oct. 11, 2011, 3 pages.
Foreign counterpart Office Action from Japanese Patent Application No. 2009-045539 mailed Sep. 11, 2012, 3 pages (includes English translation).

\* cited by examiner

*Primary Examiner* — Khanh Dang
(74) *Attorney, Agent, or Firm* — Blakely, Sokoloff, Taylor & Zafman LLP

(57) ABSTRACT

A technique to promote determinism among multiple clocking domains within a computer system or integrated circuit, In one embodiment, one or more execution units are placed in a deterministic state with respect to multiple clocks within a processor system having a number of different clocking domains.

20 Claims, 4 Drawing Sheets

TECHNIQUE FOR PROMOTING DETERMINISM AMONG MULTIPLE CLOCK DOMAINS

FIELD OF THE INVENTION

Embodiments of the invention relate generally to the field of information processing and more specifically, to the field of clocking in computing systems and microprocessors.

BACKGROUND

As more functionality is integrated into modern microprocessors, functional units within the processor may need to be operated ("clocked") at different clock frequencies, phases, etc. With more clocking domains within the same processor comes an increase in complexity in promoting determinism for purposes, such as testing. Some testing techniques use may use periodic system management interrupts (PSMI) to step through programs running on a processor and to return results of processing at various points in the program.

PSMI is a debug methodology whereby a logic analyzer traces external bus activity in a circular buffer while System Management Interrupts, or SMIs, are periodically generated, frequently enough that to always ensure two sequential ones are in the logic analyzer buffer. The PSMI handler saves internal processor state to memory allowing much of the internal state of the processor to be reconstructed afterwards on an emulator or software model of the processor, and the trace information is used to reproduce the bug.

Typically, PSMI relies on processing resources, such as execution resources, being synchronized with other events within the processor in order for deterministic results to be returned by processor. Use of PSMI techniques become more difficult as the number of clocking domains increases, due, for example, to more functionality being integrated within the same processor.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION

Figure 1:
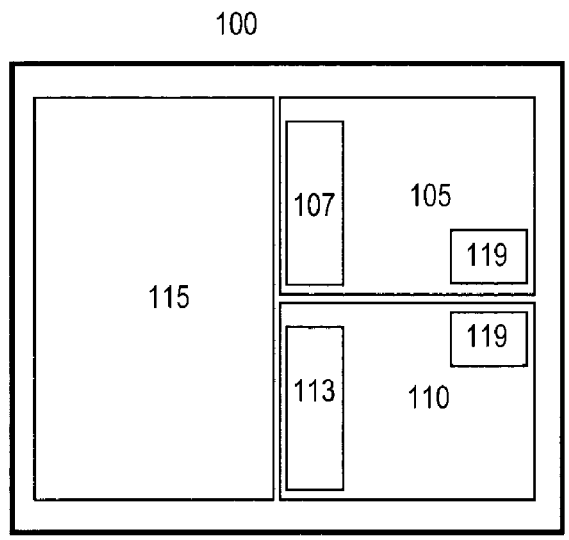
FIG. 1 illustrates a block diagram of a microprocessor, in which at least one embodiment of the invention may be used.

FIG. 1 illustrates a microprocessor in which at least one embodiment of the invention may be used. In particular, FIG. 1 illustrates microprocessor 100 having one or more processor cores 105 and 110, each having at least one non-cpu functional unit 107 and 113, respectively. Also illustrated in FIG. 1 is at least one other non-CPU functional unit 115 which may perform other operations not performed by functional units 107 and 113. In one embodiment, the functional units 107, 113, and 115 may include functions such as graphics processing, memory control and peripheral control, such as audio, video, disk control, digital signal processing, etc. In some embodiments, microprocessor 100 may also include other logic not shown in FIG. 1, such as I/O control. In one embodiment, each microprocessor in a multi-processor system or each processor core in a multi-core processor may include or otherwise be associated with logic 119 to enable techniques to promote determinism in a processor having multiple clock domains, in accordance with at least one embodiment. The logic may include hardware circuits to synchronize one or more execution resources with one or more clocks or events within a processor, according to one embodiment. In other embodiments, the logic 119 may include software to help promote determinism in execution resources in processors having a number of clocking domains. In other embodiments a combination of hardware and software may be used to perform determinism promoting techniques described herein.

In one embodiment, logic may be used within or outside of an integrated circuit to put into a deterministic state, execution resources within a processor having multiple clocking domains due to diverse functionality within the processor, in order to assist in the improvement, debug, or optimization of software programs, such as applications, operating systems, BIOS, firmware, etc. For example, in one embodiment, the logic 119 includes a universal clock pulse generator (UCPG) to generate a common clock pulse based off of common clock edges or events from a number of different clocks having a number of different frequencies or phases. In one embodiment, an output of the UCPG is used to change the state of a counter, which when at or beyond a certain threshold count value causes execution resources to begin processing instructions associated with a program to be debugged or optimized, in order to promote the execution resources being in a deterministic state relative to the various clocks within the processor, as represented by the UCPG signal.

For example, in one embodiment, a counter is initialized to an initial value and an execution unit to be synchronized halts. As signal edges from a UCPG cause the counter to decrement (or increment, in one embodiment), the counter reaches a certain threshold value, such as a "0" value, causing an interrupt to occur to the execution unit. The execution unit then starts executing instructions at deterministic point relative to the various clocks in the processor that contribute to the generation of the UCPG signal. With the execution in a deterministic state relative to the various clocking domains within the processor, processing code may be debugged or optimized using techniques, such as PSMI, in a more reliable manner. In one embodiment, techniques described herein may be used in a processor having multiple processor cores, multiple different functions, such as graphics, memory control, various peripheral control (such as in "system-on-a-chip" processors). Techniques disclosed herein may also be used in computer systems in which multiple functions are distributed among separate integrated circuits.

Figure 2:
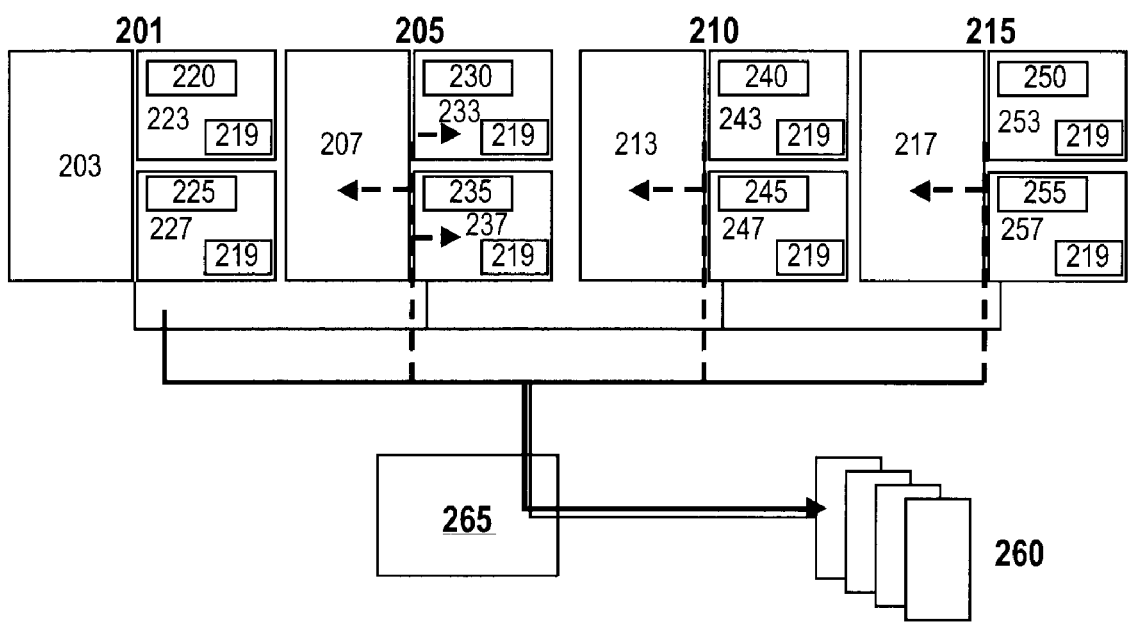
FIG. 2 illustrates a block diagram of a shared bus computer system, in which at least one embodiment of the invention may be used.

FIG. 2, for example, illustrates a front-side-bus (FSB) computer system in which one embodiment of the invention may be used. Any processor 201, 205, 210, or 215 may access information from any local level one (L1) cache memory 220, 225, 230, 235, 240, 245, 250, 255 within or otherwise associated with one of the processor cores 223, 227, 233, 237, 243, 247, 253, 257. Furthermore, any processor 201, 205, 210, or 215 may access information from any one of the shared level two (L2) caches 203, 207, 213, 217 or from system memory 260 via chipset 265. One or more of the processors in FIG. 2 may include or otherwise be associated with logic 219 to promote processing determinism among multiple clock domains.

Figure 3:
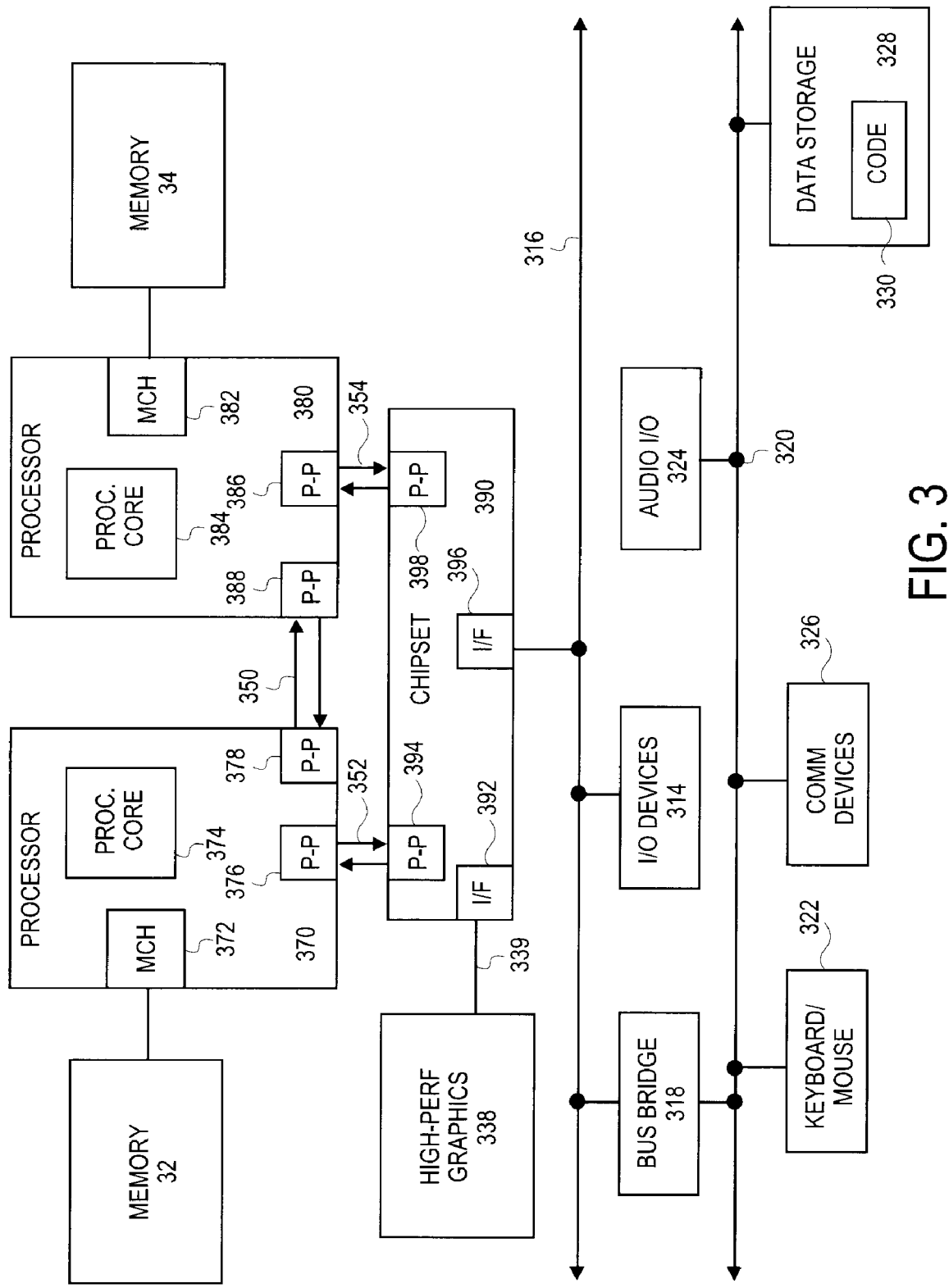
FIG. 3 illustrates a block diagram a point-to-point interconnect computer system, in which at least one embodiment of the invention may be used.

In addition to the FSB computer system illustrated in FIG. 2, other system configurations may be used in conjunction with various embodiments of the invention, including point-to-point (P2P) interconnect systems and ring interconnect systems. The P2P system of FIG. 3, for example, may include several processors, of which only two, processors 370, 380 are shown by example. Processors 370, 380 may each include a local memory controller hub (MCH) 372, 382 to connect with memory 32, 34. Processors 370, 380 may exchange data via a point-to-point (PtP) interface 350 using PtP interface circuits 378, 388. Processors 370, 380 may each exchange data with a chipset 390 via individual PtP interfaces 352, 354 using point to point interface circuits 376, 394, 386, 398. Chipset 390 may also exchange data with a high-performance graphics circuit 338 via a high-performance graphics interface 339. Embodiments of the invention may be located within any processor having any number of processing cores, or within each of the PtP bus agents of FIG. 3. In one embodiment, any processor core may include or otherwise be associated with a local cache memory (not shown). Furthermore, a shared cache (not shown) may be included in either processor outside of both processors, yet connected with the processors via p2p interconnect, such that either or both processors' local cache information may be stored in the shared cache if a processor is placed into a low power mode. One or more of the processors or cores in FIG. 3 may include or otherwise be associated with logic to promote execution determinism within a processor or other integrated circuit within the system. The logic may include or be associated with storage, such as one or more counters and a UCPG to place execution resources in a deterministic state, as described herein, in order to help debug or optimize programs using techniques, such as PSMI.

Figure 4:
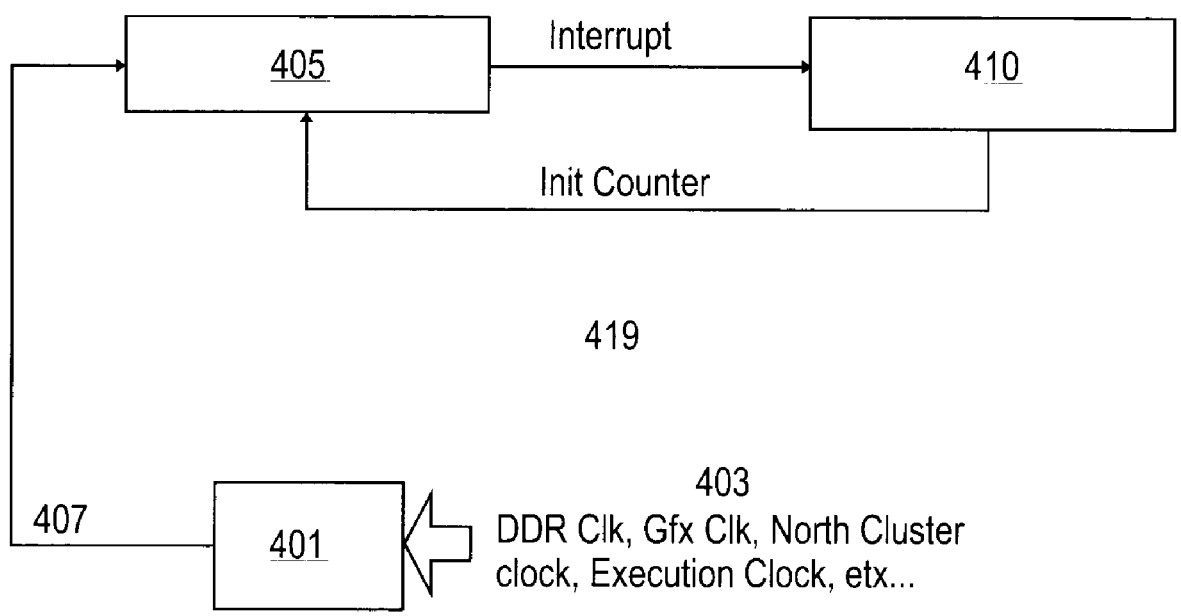
FIG. 4 illustrates a block diagram of logic, in which at least one embodiment of ay be implemented.

FIG. 4 illustrates logic to perform at least one embodiment of the invention. In one embodiment, the logic 419 includes a UCPG 401 to receive a number of different clock pulses 403 having a number of different (or same) frequencies and/or phases and to generate a common clock pulse whose frequency and phase corresponds to a common state of the different clock pulses. For example, in one embodiment, the counter counts from a non-zero value down to zero. UCPG can implement a number of different techniques to ensure generate a signal that is deterministic in relation to a number of clock signals, each of which may be out of phase or have different frequencies. Logic 419 also includes, in one embodiment, a counter 405 to count from an initial value to a threshold value at a frequency corresponding to the output signal 407 from the UCPG. For example, in one embodiment, the counter is set to a non-zero value and counts down to threshold value, such as a "0" value, whereas in other embodiment the counter is initialized to a value, such as "0", and counts up to a threshold value. In one embodiment, the counter 405 may be a number of counters, each working in conjunction or separately to put one or more execution resources in a deterministic state relative to at least two different clocking domains.

When the counter reaches the threshold value, it may cause at least one execution unit 410 to be interrupted from a halted state and place the at least one execution unit into a deterministic state relative to the UCPG clock pulse, thereby putting the execution unit in a deterministic state relative to the clocks represented by the UCPG clock pulse. Using the logic 419, debug or optimization techniques, such as PSMI, may be used to help develop or debug programs that run in processors having multiple clocking domains.

Figure 5:
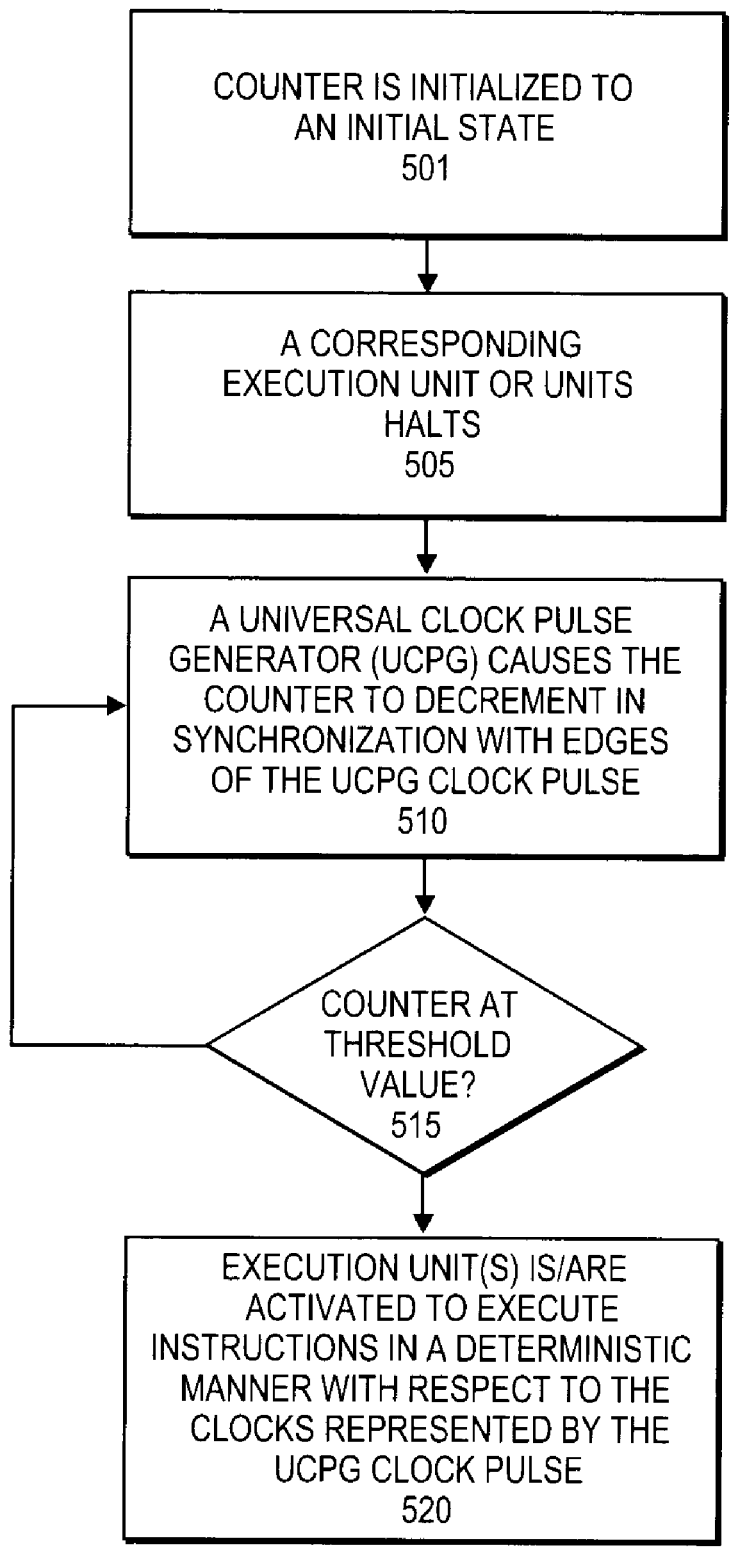
FIG. 5 is a flow diagram of operations that may be used for performing at least one embodiment of the invention.

FIG. 5 illustrates a flow diagram of operations that may be used in conjunction with at least one embodiment of the invention, regardless of the processor or system configuration in which the embodiment is used. At operation 501, a counter is initialized to an initial state. In one embodiment, the initial state represents a value greater than zero. At operation 505, a corresponding execution unit or units halts. At operation 510, a universal clock pulse generator (UCPG) causes the counter to decrement in synchronization with edges of the UCPG clock pulse. In other embodiments, the UCPG pulse causes the counter to increment in value. At operation 515, when the counter reaches a threshold value, the corresponding execution unit(s) is/are activated to execute instructions in a deterministic manner with respect to the clocks represented by the UCPG clock pulse at operation 520. With the execution unit(s) in a deterministic state with the various clocks within the processor synchronized with the UCPG clock pulse, debug or optimization techniques, such as PSMI, can be used to help debug or develop software programs intended to run a processor or system having multiple clocking domains.

One or more aspects of at least one embodiment may be implemented by representative data stored on a machine-readable medium which represents various logic within the process, which when read by a machine causes the machine to fabricate logic to perform the techniques described herein. Such representations, known as "IP cores" may be stored on a tangible, machine readable medium ("tape") and supplied to various customers or manufacturing facilities to load into the fabrication machine that actually make the logic or processor.

Thus, a method and apparatus for directing micro-architectural memory region accesses had been described. It is to be understood that the above description is intended to be illustrative and not restrictive. Many other embodiments will be apparent to those of skill in the art upon reading and understand the above description. The scope of the invention should, therefore, be determined with reference to the appended claims, along with the full scope of equivalents to which such claims are entitled.

What is claimed is:

1. An apparatus comprising:
    a universal clock pulse generator (UCPG) to receive a plurality of different clock signals having a plurality of different frequencies and phases and generate therefrom a clock pulse common to the plurality of different clock signals having a plurality of different frequencies and phases;
    a counter to count from an initial value to a threshold value at a frequency proportional to the UCPG clock pulse;
    at least one execution unit to be activated from a halted state as a result of the counter reaching the threshold value.

2. The apparatus of claim 1, wherein the at least one execution unit is to reset the counter to the initial state.

3. The apparatus of claim 1, wherein the initial value is a non-zero value and wherein the threshold value is a zero value.

4. The apparatus of claim 1, wherein the UCPG clock pulse frequency is equal to the frequency of the change in count of the counter.

5. The apparatus of claim 1, wherein further including an instruction decoder, an instruction scheduler, and an instruction retirement unit.

6. A system comprising:
    a memory including a software program;

a processor to perform the software program, wherein the processor has at least one execution unit and a plurality of clocking domains corresponding to a plurality of functionality;

logic to promote determinism in the at least one execution unit relative to the plurality of clocking domains, the logic including a counter to count from an initial state to a threshold state at a rate corresponding to a universal clock pulse, wherein the universal clock pulse is generated from a plurality of clocks from the plurality of clocking domains.

7. The system of claim 6 further comprising a periodic system management interrupt (PSMI) logic to assist in debug of the software program, wherein the PSMI logic is to be synchronized with the plurality of clocking domains according to the determination promotion logic.

8. The system of claim 7, wherein the processor includes a cpu, a graphics engine, a memory control unit, and at least one peripheral control unit.

9. The system of claim 8, further comprising a plurality of processors.

10. The system of claim 9, wherein at least two of the plurality of processors have a plurality of clocking domains.

11. A method comprising:
a initializing a counter to an initial value;
halting an execution unit coupled to the counter;
changing the counter value at a rate proportional to a universal clock pulse generator (UCPG) signal frequency, wherein UCPG signal frequency has been generated from a plurality of different clock signals having a plurality of different frequencies and phases;
activitating the execution unit after the counter reaches a threshold value.

12. The method of claim 11, wherein the execution unit causes the counter to be placed at an initial value.

13. The method of claim 11, wherein the UCPG signal represents a plurality of clock signals from a plurality of clocking domains.

14. The method of claim 11, wherein the execution unit is activated by generating an interrupt signal after the counter value reaches the threshold value.

15. The method of claim 11, wherein the initial counter value is a non-zero value and the threshold value is a zero value.

16. A machine-readable medium having stored thereon a set of instructions, which if performed by a machine cause the machine to perform a method comprising:
executing a plurality of instructions within an execution unit;
generating a periodic system management interrupt (PSMI) signal at a deterministic point with plurality of instruction, wherein the deterministic point is a result of determinism logic placing the execution at a known state in relation to a plurality of clocks from a plurality of clock domains, wherein the determinism logic includes a counter to cause the execution to activate from a halted state when the counter reaches a threshold value, wherein the counter is to count to the threshold value at a rate proportional to a universal clock pulse generated from plurality of clocks from the plurality of clock domains.

17. The machine-readable medium of claim 16, wherein the initial value is a value greater than zero and the threshold value is zero.

18. The machine-readable medium of claim 16, wherein the initial value is zero and the threshold value is greater than zero.

19. The machine-readable medium of claim 16, wherein the execution unit is associated with a system-on-a-chip (SoC) processor.

20. The machine-readable medium of claim 19, wherein the SoC processor includes at least one CPU, a graphics engine, a memory controller, and at least one peripheral controller.

* * * * *

UNITED STATES PATENT AND TRADEMARK OFFICE
CERTIFICATE OF CORRECTION

PATENT NO. : 8,312,309 B2
APPLICATION NO. : 12/042985
DATED : November 13, 2012
INVENTOR(S) : Hendrickson et al.

Page 1 of 1

It is certified that error appears in the above-identified patent and that said Letters Patent is hereby corrected as shown below:

In the Specification

In column 4, line 21 after, -- run -- insert -- on --.

In column 4, line 26 delete, "process" and insert -- processor --.

In column 4, line 31 delete, "machine" and insert -- machines --.

In column 4, line 33 delete, "had" and insert -- has --.

In column 4, line 37 delete, "understand" and insert -- understanding --.

Signed and Sealed this
Twenty-second Day of April, 2014

Michelle K. Lee
*Deputy Director of the United States Patent and Trademark Office*